United States Patent [19]

Handwerk

[11] Patent Number: 4,637,574

[45] Date of Patent: Jan. 20, 1987

[54] ATTENUATING, EXTENDIBLE SHOCK-ABSORBING STRUT

[75] Inventor: Roy R. Handwerk, Hicksville, N.Y.

[73] Assignee: Menasco Inc., Burbank, Calif.

[21] Appl. No.: 650,608

[22] Filed: Sep. 14, 1984

[51] Int. Cl.⁴ ............................................. B64C 25/60
[52] U.S. Cl. ........................ 244/104 FP; 244/104 R; 244/63
[58] Field of Search ................ 244/63, 100 R, 104 R, 244/104 FP; 267/64.26, 64.28; 92/108, 84

[56] References Cited

U.S. PATENT DOCUMENTS

| | | | |
|---|---|---|---|
| Re. 30,896 | 4/1982 | Jenkins et al. ............... | 244/104 FP |
| 1,068,165 | 7/1913 | Peterson ................... | 244/63 |
| 1,254,898 | 1/1918 | Frost ....................... | 244/63 |
| 1,317,414 | 9/1919 | Atkinson ................... | 244/63 |
| 1,702,682 | 2/1929 | Carey ...................... | 244/63 |
| 1,745,081 | 1/1930 | Crumbaugh ................. | 244/63 |
| 1,767,120 | 6/1930 | Canfield ................... | 244/63 |
| 2,735,634 | 2/1956 | Fosness .................... | 244/104 FP |
| 2,977,134 | 3/1961 | Helling .................... | 280/124 |
| 2,989,983 | 6/1961 | Valentine .................. | 137/599 |
| 3,011,777 | 12/1961 | Stout ...................... | 267/64 R |
| 3,023,740 | 3/1962 | Samuel, Jr. et al. ......... | 92/15 |
| 3,263,986 | 8/1966 | Tollar ..................... | 267/64 R |
| 3,290,038 | 12/1966 | Tollar ..................... | 267/64.26 |
| 3,292,919 | 12/1966 | Lindley et al. ............. | 267/64 R |
| 3,533,613 | 10/1970 | Bendicsen .................. | 267/64 R |
| 3,747,913 | 7/1973 | Savery ..................... | 267/64 R |
| 3,874,692 | 4/1975 | Ono ........................ | 280/124 F |
| 4,065,078 | 12/1977 | Jenkins et al. ............. | 244/104 FP |
| 4,075,929 | 2/1978 | Peterson ................... | 92/108 |
| 4,114,866 | 9/1978 | Kato ....................... | 267/64 R |
| 4,153,266 | 5/1979 | Uhls ....................... | 280/276 |
| 4,165,066 | 8/1979 | Horvat ..................... | 267/65 D |
| 4,231,554 | 11/1980 | Ekonen ..................... | 267/65 D |
| 4,245,854 | 1/1981 | Curnutt .................... | 280/711 |
| 4,273,303 | 6/1981 | Somm ....................... | 244/104 FP |
| 4,291,850 | 9/1981 | Sharples ................... | 244/102 SS |
| 4,300,664 | 11/1981 | Helm et al. ................ | 188/265 |
| 4,524,929 | 6/1985 | Gebhard .................... | 244/63 |

OTHER PUBLICATIONS

H. G. Conway, "Landing Gear Design", Chapman & Hall Ltd., 1958, pp. 176 to 181.

T. P. Watson, "Fundamentals", Machine Design, a Penton publication, Mar. 22, 1962, pp. 34 to 42.

TRW Systems Group, "Aerospace Fluid Component Designers' Handbook", TRW, Feb. 1970, p. 6.9.3.2.

*Primary Examiner*—Sherman D. Basinger
*Assistant Examiner*—Rodney Corl
*Attorney, Agent, or Firm*—Clair X. Mullen; Richard A. Dornon; Radford W. Luther

[57] ABSTRACT

A rapidly extendible, rough-field attenuating shock-absorbing strut, particularly adapted for use with an aircraft having a tricycle landing gear, is used during takeoff and is adapted for rapid extension to provide angular or upward momentum to the aircraft and thus facilitate takeoff. The strut comprises an outer cylinder which is secured to the aircraft and an inner cylinder adapted for longitudinal reciprocation within the outer cylinder. The inner cylinder has a wheel mounted thereon at the end opposite that of the outer cylinder. A piston is secured for longitudinal reciprocation within both the outer and inner cylinders. The piston has a piston head adapted for reciprocation within the outer cylinder. Provision is made for applying fluid pressure to the piston head to cause it to move longitudinally toward the inner cylinder and provision is made, in association with the piston and inner cylinder, for moving the inner cylinder longitudinally and away from the aircraft and outer cylinder when said piston moves toward the inner cylinder. This causes rapid extension of the inner cylinder to provide angular or upward momentum to the aircraft. Also valving is provided to allow the inner cylinder to reciprocate within the outer cylinder by altering the flow and/or amount of the fluids within the strut for shock attenuation over rough surfaces.

23 Claims, 6 Drawing Figures

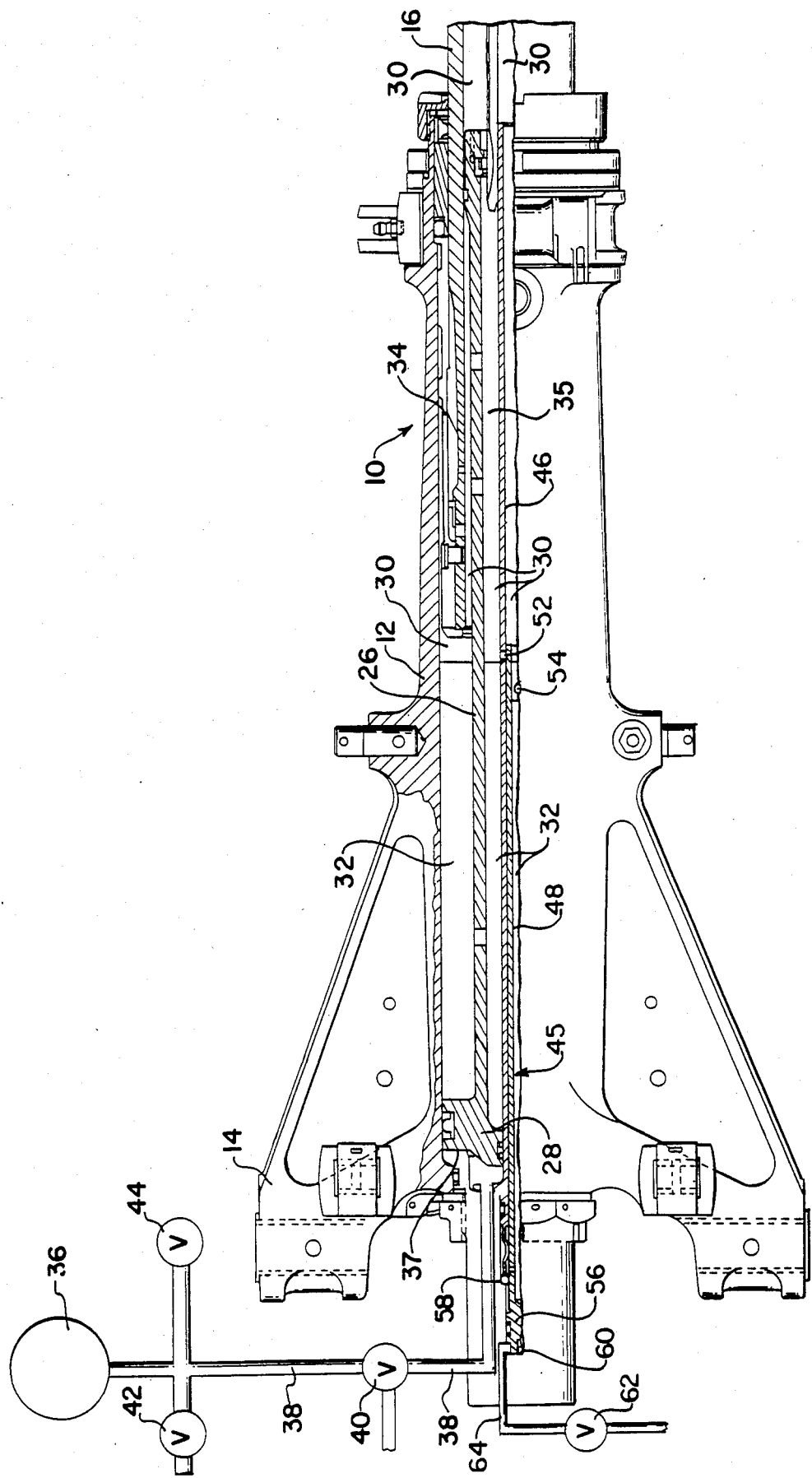
FIG. I

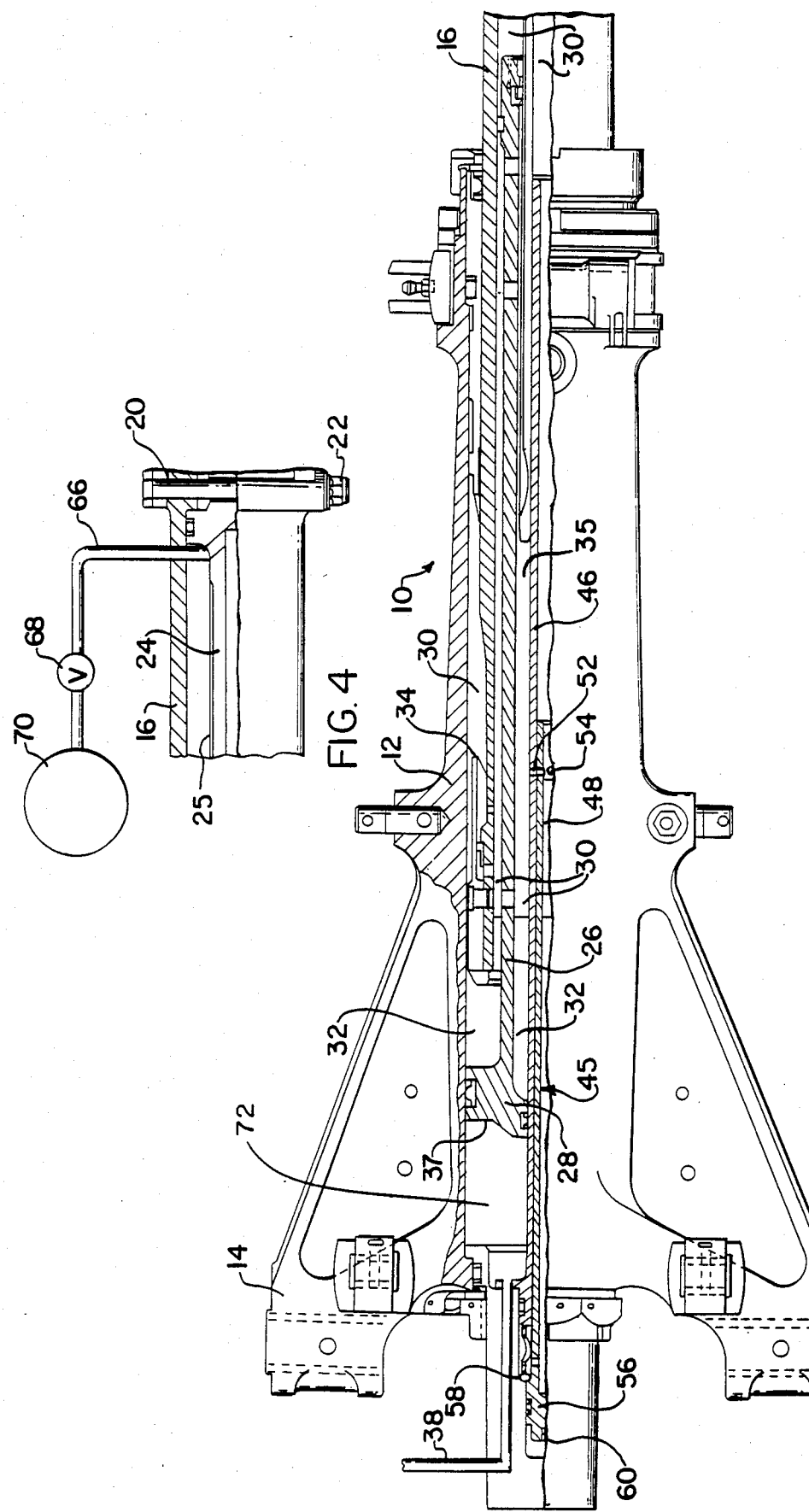

ATTENUATING, EXTENDIBLE SHOCK-ABSORBING STRUT

BACKGROUND OF THE INVENTION

The present invention relates to rapidly extendible, energy dissipating landing gear struts for aircraft.

It is desirable to provide shortened takeoff capability to aircraft which may be operating from repaired runways or for aircraft which have increased payloads and for providing additional safety by shorter takeoff distances. It is known that rapidly extendible struts in the landing gear of aircraft greatly improve the desired takeoff performance.

If such a rapidly extendible strut is used only in the nose gear of the aircraft the upward force produced by its action imparts a rotational momentum and increased angle of attack to the aircraft, resulting in a significant reduction in takeoff distance. Rapidly extendible struts used in the main gears of an aircraft impart an upward momentum to the entire aircraft. The use of rapidly extendible struts in the nose and main gears results in a further shortening of the takeoff distance.

When the nose and main gear struts both incorporate the rapid extension feature, the rapid extension (jump) actions are sequenced so that the nose strut jumps first, followed by the main gear after the aircraft has rotated to a specific nose-up attitude. This sequencing can be accomplished by several means such as a tail-touch switch, or an altitude sensor, or a nose gear extension switch.

Such rapidly extendible struts have been proposed which required a mechanical latching arrangement to maintain the strut in a compressed position during the takeoff run until the critical velocity for jumping is attained. This adds to the complexity and detracts from the reliability of the device and is difficult to incorporate in smaller struts.

SUMMARY OF THE INVENTION

In accordance with the invention, there is provided a rapidly extendible shock-absorbing strut or jump strut for an aircraft. Extension of a strut of the invention is capable of imparting upward or angular momentum to its associated aircraft without mandating latching. In addition, a strut of the invention may include means to control the level of momentum imparted to the aircraft and means to allow for rapid reversion of the strut to the landing mode following rapid extension (jump), thereby contributing to aircraft and crew safety. Moreover, a strut of the invention may be advantageously provided with valving to permit shock attenuation over rough surfaces to thereby prevent damaging forces from being transmitted to the aircraft.

It is accordingly a primary object of the present invention to provide a rapidly extendible shock-absorbing strut wherein extension of the strut to impart angular or upward momentum to the aircraft is achieved without requiring latching. Another object is to provide a rapidly extendible, shock absorbing strut having means to control the level of momentum imparted to the aircraft and means for rapid reversion of the strut to the landing mode following rapid extension (jump) for aircraft and crew safety.

A more specific object of the invention is to provide a strut of this character having the additional function of preventing damaging forces from being transmitted to the aircraft structure, which function may be termed rough-field attenuation.

This and other objects of the invention, as well as a more complete understanding thereof, may be obtained from the following description and drawings, in which:

BRIEF DESCRIPTION OF THE DRAWINGS

FIGS. 1 and 1a constitute a side elevation in partial section of one embodiment of a strut in accordance with the invention;

FIG. 4 is a schematic showing of an alternate embodiment of the invention; and

FIG. 5 is a side elevation in partial section showing a modification of the strut of FIG. 1 and FIG. 1a.

DETAILED DESCRIPTION OF PREFERRED EMBODIMENTS

Figure 1A:
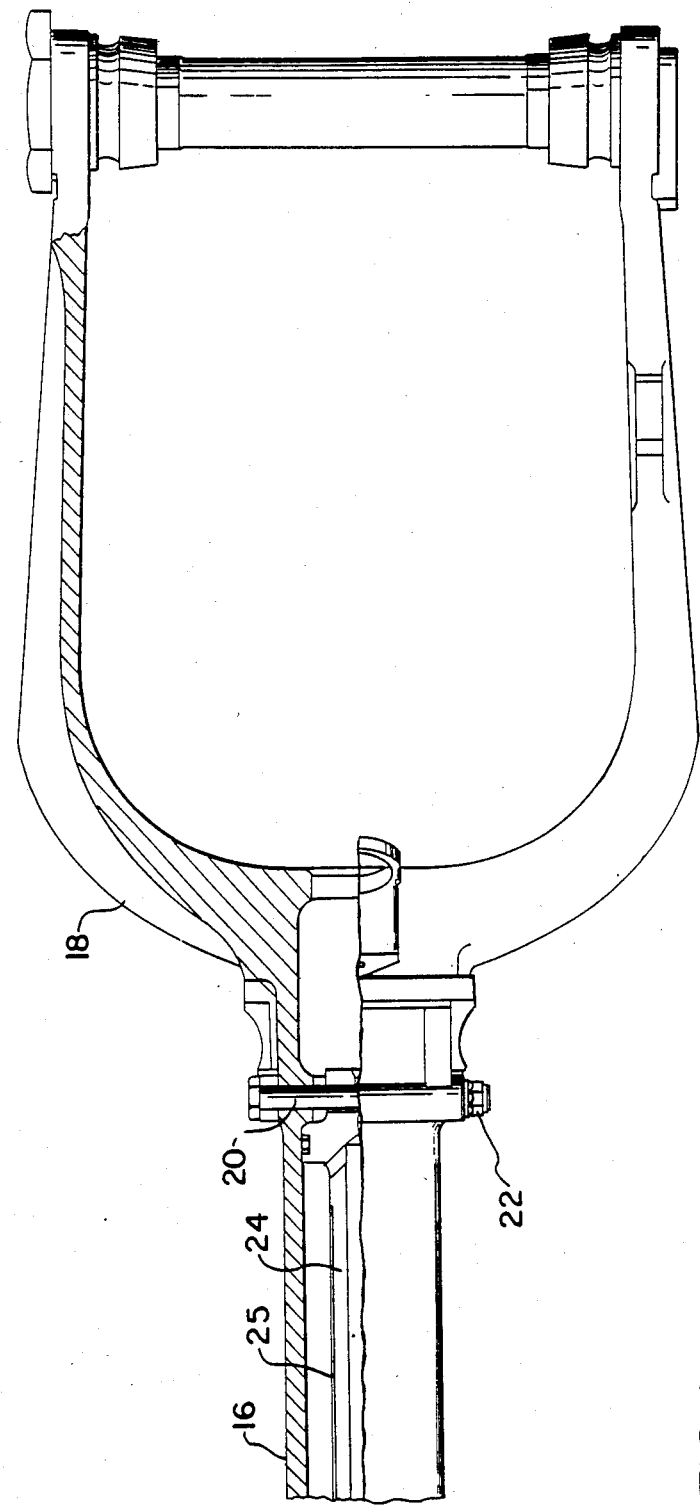

In combat, it is likely that military airbase runways will be damaged and hastily repaired. Conventional aircraft landing gear struts do not permit much upward motion of the wheel beyond the normal static position. Hence, there is not much travel available to absorb rolling shocks due to uneven surface conditions. The landing forces these struts absorb as a function of stroke and stroke rate are also tailored for efficient dissipation. The rapid extension of the strut of this invention includes means for selectively changing the strut's static position and/or its force characteristics with stroke and/or stroke rate to provide improved rolling shock attenuation while retaining full efficient shock dissipation and rapid-extension capability.

In this invention the rough-field attenuation capability is provided by means of strut features that can change the static stroke and/or use a valve which can be operated to open a secondary fluid flow passage. These features, in combination with the normal landing shock absorption orifice/metering pin mechanism, provide the modified shock absorption characteristics necessary to accommodate the bumps expected under rough-field conditions. The rough-field attenuation function can be activated by means of pressure sensors monitoring the hydraulic fluid entrapped within the strut or load/strain sensors monitoring forces within the inner cylinder or other structural members, or from a combination of other sensors.

In this invention the rough-field attenuation capability is integrated into the strut with the rapid extension capability and the normal landing shock absorption mechanism. Means are provided to deactivate the rough-field attenuation function during landing and/or rapid extension.

The invention embodies a strut comprising an outer cylinder, which is secured to the aircraft. An inner cylinder is adapted for longitudinal reciprocation within the outer cylinder and has on the end thereof opposite the outer cylinder conventional means for journalizing a wheel and axle. A piston is mounted for longitudinal reciprocation within both the inner and outer cylinders and the piston has a piston head contained within the outer cylinder. The piston reciprocates within the inner cylinder and the piston head within the outer cylinder. Means are provided for applying fluid pressure to the piston head to cause the piston to move longitudinally away from the outer cylinder and toward the inner cylinder. The means for applying fluid pressure may be in the form of a charge of compressed gas, such as nitrogen. Means are provided in association with the piston and inner cylinder to move the inner cylinder longitudinally or away from the aircraft and outer cylinder when the piston moves longitudinally toward the inner cylinder. This action or longitudinal movement of the inner cylinder relative to the outer cylinder provides an upward or rotational momentum to the aircraft to facilitate shorter takeoff distance. The means in association with the piston and inner cylinder for moving the inner cylinder away from the aircraft includes a metering pin connected to the inner cylinder for movement therewith, a longitudinal passage within the piston into which the metering pin extends for longitudinal, reciprocal movement and an orifice within the metering pin, which orifice extends between the longitudinal passage of the piston and the metering pin. A quantity of incompressible fluid is provided within the longitudinal passage and the inner cylinder and the flow of this fluid is metered through the orifice separating the longitudinal passage and inner cylinder. This metered flow imparts hydraulic pressure to the inner cylinder and thus facilitates the desired movement of the inner cylinder away from the aircraft when it is desired to facilitate shorter takeoffs.

In addition, during longitudinal movement of the piston toward the inner cylinder, the piston head can contact the end portion of the inner cylinder opposite the end thereof on which the wheel is journaled and this further facilitates movement of the inner cylinder and associated wheel away from the aircraft. The compressed fluid above the incompressible fluid prevents the piston head from severely impacting the end portion of the inner cylinder. Consequently, the rapid extension of the inner cylinder when it is desired to facilitate takeoff of the aircraft is achieved by a combination of hydraulic, pneumatic and mechanical impetus.

After achieving the desired momentum, the fluid pressure is relieved from between the piston head and the outer cylinder, which is the only action required to bring the strut to normal operation suitable for landing the aircraft.

To provide for the desired rough-field attenuation, means are provided for permitting the incompressible liquid to flow from the inner cylinder to the outer cylinder and longitudinal passage or alternately to an accumulator exterior of the strut. This liquid flow is permitted by an internal valve for opening additional orifices selectively between the inner cylinder and the outer cylinder and longitudinal passage or by an external valve permitting flow to an accumulator exterior of the strut. The internal valve may be activated by mechanical or fluid means. The internal valve may include an outer valve sleeve and a valve piston adapted for relative longitudinal reciprocating movement to provide for selective alignment of the additional orifices. The outer valve sleeve provides a stop for said valve piston during movement thereof for aligning said orifices. The internal pressure provided within said strut opposes the valve piston which maintains the internal valve closed when deactivated.

The strut may be provided with an external valve connected with pressure lines between the exterior pressure accumulator vessel and the inner cylinder to regulate flow of the incompressible liquid from the inner cylinder to the external pressure accumulator. This external valve may be activated when a preset fluid pressure occurs within the inner cylinder. The external valve may also be adapted to provide for the incompressible liquid to flow from the exterior pressure accumulator vessel to the inner cylinder.

The external valve permitting fluid flow to the external pressure accumulator may likewise be activated when a preset fluid pressure occurs within the inner cylinder. Valve actuating means may embody a load sensor attached to the inner cylinder opposite the end within the outer cylinder. Valve actuation may alternately be effected by an accelerometer sensor connected to the inner cylinder.

The means for applying fluid pressure to the piston head may be adapted to provide a quantitative amount of compressed gas for a selective positioning of the piston within the outer cylinder.

With reference to the drawings, and for the present to FIGS. 1 and 1a thereof, there is shown a strut designated generally as 10 which strut includes an outer cylinder 12 adapted for connection to an aircraft by means of conventional braces 14. The strut 10 also includes an inner cylinder 16 having on an end thereof a conventional bifurcated mounting 18. The mounting 18 is in the well known manner adapted for journaling of a wheel and axle (not shown). The inner cylinder 16 is adapted for sliding movement within the outer cylinder 12 and has connected thereto by bolt 20 and nut 22 a metering pin 24. Metering pin 24 moves longitudinally with the inner cylinder 16. A piston 26 is positioned within the outer cylinder and has a piston head 28 on an end thereof opposite said inner cylinder 16 and metering pin 24. A quantity of incompressible fluid 30, such as oil, is provided within the inner cylinder. As shown in FIG. 1 with the piston 26 fully retracted with the piston head 28 abutting against stop 37 of the outer cylinder 12 the fluid 30 is contained within the inner cylinder and within the indicated portion of the outer cylinder and inner cylinder. Compressed gas, designated as 32, which may be nitrogen, is contained between the fluid 30 and the piston head 28. This compressed gas serves to maintain the piston 26 in the retracted position as shown in FIG. 1 and the inner cylinder 16 and associated landing gear wheel (not shown) in the fully extended position absent any load on the assembly as would be the case when the aircraft is in flight. The inner cylinder 16 in this fully extended position abuts against stop 34 of the outer cylinder 12, and the piston head 28 abuts against stop 37 of the outer cylinder. The metering pin 24 has a tapered surface orifice 25 so that upon longitudinal movement of the metering pin 24 toward the piston and outer cylinder fluid 30 may be metered from the inner cylinder to a longitudinal passage 35 from where it proceeds to the outer cylinder 12.

As shown schematically in FIG. 1 means are provided for applying fluid pressure to the piston head which means include a pneumatic gas storage vessel 36 which is connected through high pressure line 38 through extension/reversion valve 40 to the end of outer cylinder 12 adjacent the piston head 28. In association with the gas storage vessel 36 and high pressure lines 38 is a pressure relief valve 42 and a charging valve 44.

Figure 2:
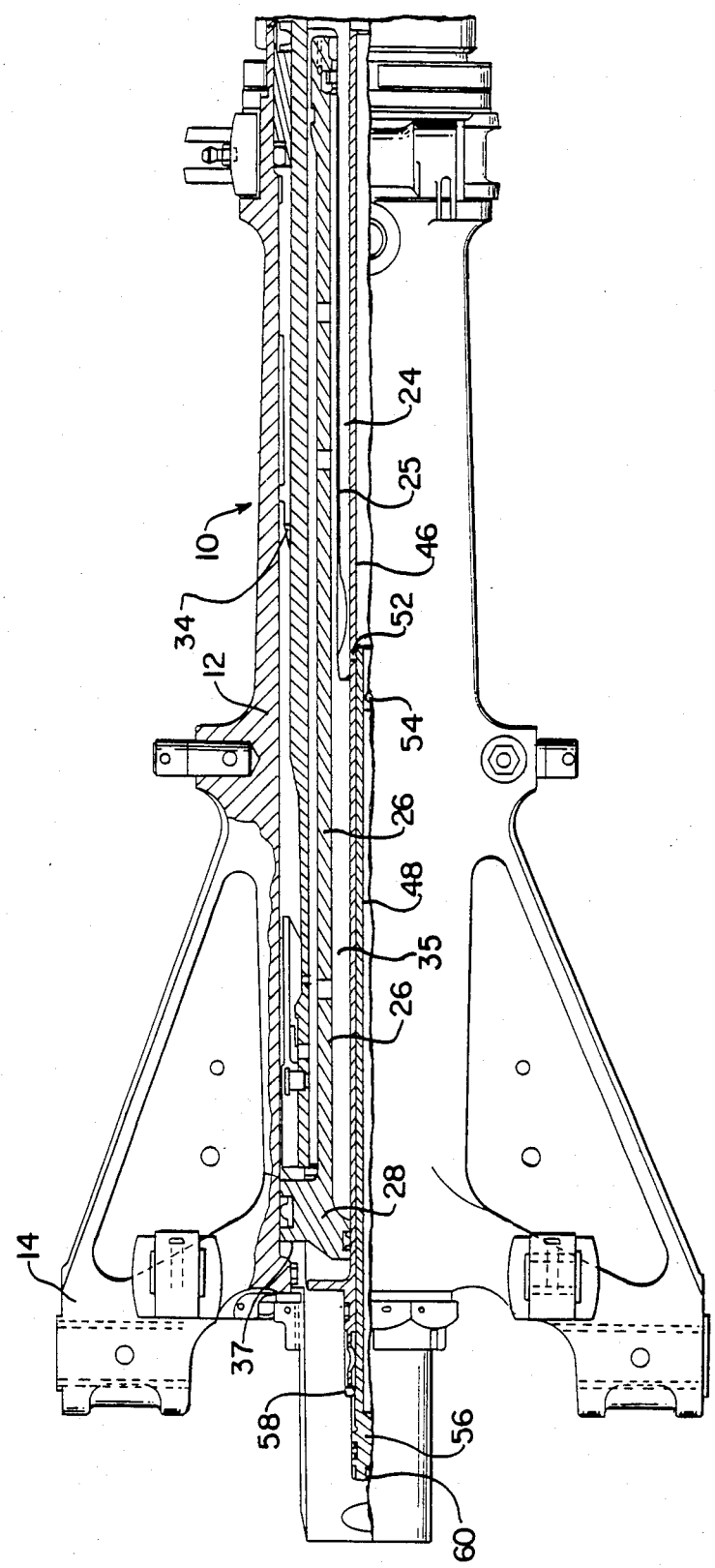
FIG. 2 is a similar view of the strut of FIG. 1 and FIG. 1a showing the assembly in the fully compressed condition.

In operation of the strut of the invention when the aircraft is in flight the assembly is as shown in FIG. 1 with the inner cylinder 16 which carries the wheel of the landing gear in the fully extended position and abutting against stop 34 of the outer cylinder. Also, the piston 26 is in the fully retracted position with the piston head 28 being maintained against stop 37 of the outer cylinder. During normal taxiing the weight of the aircraft transferred through the strut to the taxiing surface causes the inner cylinder 16 to move longitudinally toward the aircraft within the outer cylinder. This movement and the extent thereof is dependent upon the weight and pressure applied to the wheel and the pressure within the inner cylinder 16 and outer cylinder 12. Consequently, in normal taxiing the inner cylinder 16 will reciprocate within the outer cylinder and the combination of the oil 30 and compressing gas 32 will provide the conventional static load positioning action. The furthest that the inner cylinder 16 will extend is to the position shown in FIG. 1 and the furthest that it will retract within the outer cylinder will be the position shown in FIG. 2 wherein the end of the inner cylinder contacts the piston head 28 of piston 26. During taxiing, however, the inner cylinder will be between these two extreme positions. Due to the weight of the aircraft, the normal static position of the strut is approximately 80% of the fully compressed length.

Figure 3:
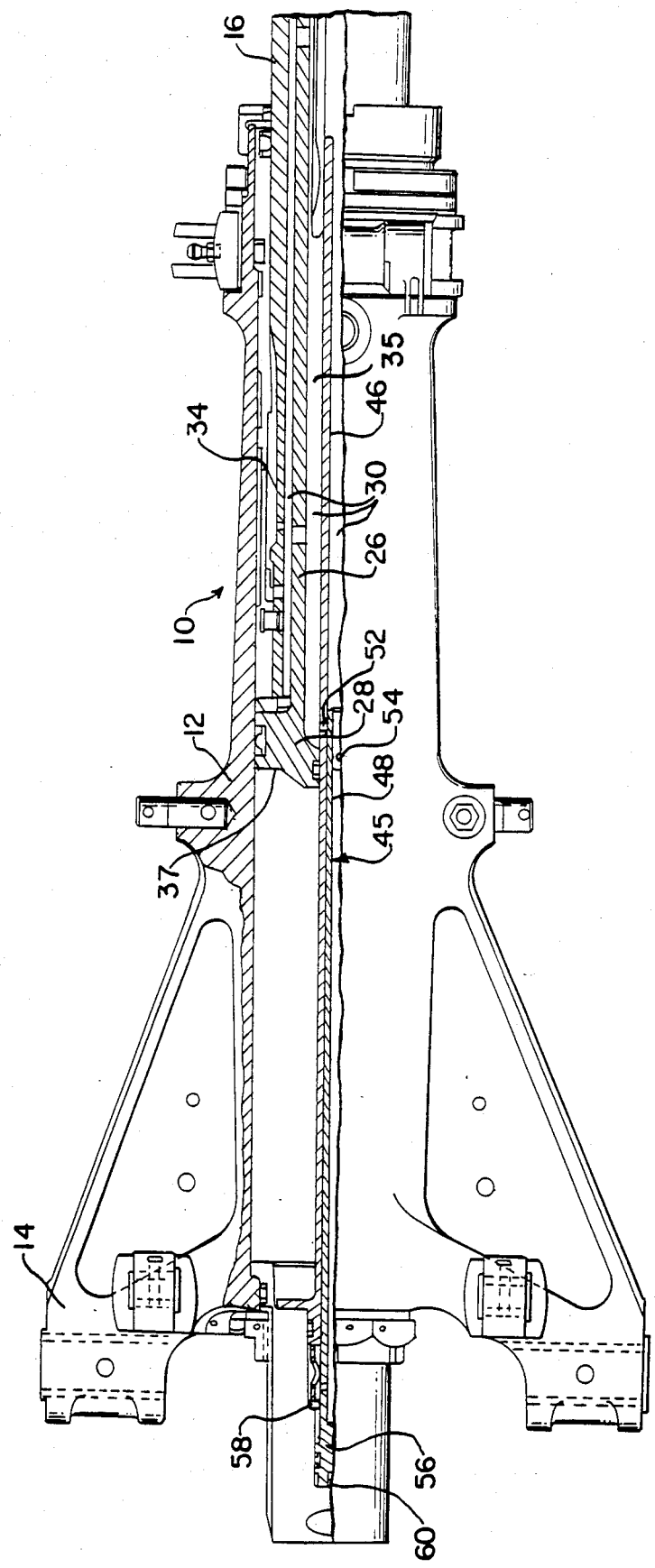
FIG. 3 is a similar view showing the assembly in the fully extended position.

If it is desired to facilitate a shortened takeoff by rapidly extending the struts during takeoff the gas storage vessel 36, which has been previously charged with compressed gas by charging valve 44, by the use of valve 40 introduces compressed gas into contact through high pressure lines 38 to the piston head 28 of piston 26 to oppose the compressed gas within the outer cylinder 12. This action will cause the piston 26 to move toward the inner cylinder 16 and assert an hydraulic force against the inner cylinder 16 through the incompressible fluid 30 and compressible fluid 32. The incompressible fluid 30 will flow through orifice 25 and eventually the piston head 28 thereof may contact the end of the inner cylinder. The piston 26 and the inner cylinder 16 will then move unitarily by contact by piston 26 which will then move to the fully extended position shown in FIG. 3. This action will be sufficiently rapid to push the nose of the aircraft upward to provide the desired upward or rotational momentum to facilitate shortened takeoff. When the proper amount of momentum has been imparted to the aircraft valve 40 will be returned to its normal position to bleed off the compressed gas within the outer cylinder 12 and thus the action of the compressed gas 32 within the outer cylinder between the piston head 28 and the end of the inner cylinder 16 will cause the piston 26 to move longitudinally to the position shown in FIG. 1 wherein the piston head 28 is against stop 37 of the outer cylinder. The strut is then in the normal operation mode required to provide the shock absorbing action for landing of the aircraft.

The storage vessel 36 and associated valves 40, 42 and 44 have been shown schematically as these components do not constitute a part of the invention and any suitable means may be used including means for operating the valves during takeoff of the aircraft wherein the use of the strut of the invention is required to facilitate shorter-distance takeoff.

During horizontal movement during takeoff, landing and taxiing, the surface in some instances may be extremely rough and uneven. This may cause damaging forces to be transmitted from the surface, through the strut and to the aircraft structure. This may result in structural damage to the landing gear and/or aircraft. Consequently, to provide for rough surface attenuation, there is provided an internal valve 45 consisting of an internal valve sleeve 46 and a valve piston 48. This sleeve and piston are mounted within the outer cylinder 12 for relative, reciprocal movement. The valve sleeve contains orifices 52 and the valve piston contains orifices 54. These orifices are adapted for selective alignment. The valve piston 48 has a piston head 56 which is adapted to reciprocate between stops 58 and 60 of said sleeve and outer cylinder, respectively. As shown schematically in FIG. 1, an activation valve 62 is connected by pressure line 64 to the aircraft hydraulic system (not shown) and to the outer cylinder 12 adjacent piston head 56.

When it is desired to adapt the strut for rough surface attenuation, the valve 62 is activated and aircraft hydraulic system fluid pressure is transmitted from the aircraft hydraulic system (not shown), through valve 62 and pressure line 64 to the valve piston head 56. This causes the associated piston 48 to slide relative to sleeve 46 until piston head 56 abuts against stop 58. This causes orifices 54 and 52 in piston 48 and sleeve 46, respectively, to be in alignment. With these orifices in alignment, fluid 30 within the inner cylinder flows through these orifices from the inner cylinder to the outer cylinder via the longitudinal passage 35. This is in addition to the fluid flow through the orifice 25 from the inner cylinder to the outer cylinder via the longitudinal passage 35. This prevents high pressure build-up of the fluid in the inner cylinder causing damaging forces to be transmitted to the aircraft structure when the wheel (not shown) on the end of the inner cylinder traverses rough surface conditions.

With reference to FIG. 4, there is shown an alternate embodiment of the invention for providing for the flow of fluid from the inner cylinder incident to adapting the strut for rough surface attenuation. Pressure line 66 is connected to the interior of the inner cylinder 16. Line 66 is also connected external to the strut to valve 68 and pressurized accumulator vessel 70. In operation, valve 68 would be opened to permit fluid from the inner cylinder to flow through line 66 to the pressurized accumulator vessel 70 when rough surface conditions cause the inner cylinder to slide toward the outer cylinder. When the inner cylinder slides in the opposite direction upon relief from the rough surface condition, fluid will flow from the pressurized accumulator vessel to the inner cylinder. Valve 68 can be operated by a signal from the pilot, from a pressure sensor sensing a predetermined pressure buildup within the inner cylinder 16, from an accelerometer mounted on the inner cylinder 16 which signals the valve 68 to open at a predetermined accelerated rate of reciprocal movement at the inner cylinder 16 within the outer cylinder 12, or from a load sensor mounted to the inner cylinder preset for a predetermined force applied to the inner cylinder. This structure obviates the need for internal valve 45 and associated structure. With reference to FIG. 5, alternately and/or additionally, the strut static position may be selectively changed to provide additional rough surface attenuation by the addition of a quantity of compressed gas 72 charged between the outer cylinder 12 and the piston head 28 to provide additional stroking of the inner cylinder 16 within the outer cylinder 12. This prevents the inner cylinder 16 from striking the piston head 28 when the piston head 28 is in contact with the outer cylinder 12 thus preventing transmission of damaging forces into the aircraft structure.

I claim:

1. A rapidly extendible, rough-field attenuating, shock-absorbing strut for use with an aircraft to provide angular or upward momentum to the aircraft during takeoff and to prevent damaging forces from being transmitted to the aircraft structure, said strut comprising an outer cylinder secured to said aircraft, an inner cylinder adapted for longitudinal reciprocation within said outer cylinder and having a wheel mounted adjacent an end thereof opposite said outer cylinder, a piston mounted for longitudinal reciprocation within both said outer and inner cylinders, said piston having a piston head on an end thereof opposite said inner cylinder, said piston head being adapted for reciprocation within said outer cylinder, means for applying fluid pressure between the outer cylinder and said piston head to cause said piston to move longitudinally toward said inner cylinder and means in association with said piston and inner cylinder for moving said inner cylinder longitudinally and away from said aircraft and outer cylinder when said piston moves longitudinally toward said inner cylinder, whereby an angular or upward momentum is provided to said aircraft.

2. The strut of claim 1 wherein fluid pressure is provided within said outer cylinder opposing said inner cylinder and piston.

3. The strut of claim 2 wherein said fluid pressure opposing said inner cylinder and piston is compressed gas.

4. The strut of claim 1 wherein said means in association with said piston and inner cylinder for moving said inner cylinder away from said aircraft includes a metering pin connected to said inner cylinder for movement therewith.

5. The strut of claim 4 wherein said means in association with said piston and inner cylinder for moving said inner cylinder away from said aircraft further includes a longitudinal passage within said piston into which said metering pin extends for longitudinal, reciprocal movement, an orifice within said piston adjacent an end thereof opposite said piston head and extending between said longitudinal passage of said piston and said metering pin and a quantity of incompressible liquid within said longitudinal passage and within said inner cylinder, which metered liquid flows into said longitudinal passage, through said orifice from said inner cylinder and imparts hydraulic pressure to said inner cylinder and thereby facilitates movement thereof away from said aircraft.

6. The strut of claim 5 wherein during longitudinal movement of said piston toward said inner cylinder said piston head contacts an end portion of said inner cylinder opposite said end thereof on which said wheel is mounted and upon said contact thereafter said inner cylinder continues to move away from said aircraft in association with said piston.

7. The strut of claim 1 wherein means are provided for relieving said fluid pressure after longitudinal movement of said inner cylinder.

8. The strut of claim 5 wherein valve means are provided for permitting said incompressible liquid to flow from said inner cylinder, whereby said inner cylinder is permitted to reciprocate to provide for rough field attenuation.

9. The strut of claim 8 wherein said valve means includes an internal valve for opening additional orifices selectively between said inner cylinder and said longitudinal passage.

10. The strut of claim 9 wherein said internal valve is activated to open said additional orifices by mechanical means.

11. The strut of claim 9 wherein said internal valve is activated by fluid means.

12. The strut of claim 9 wherein said internal valve includes an outer valve sleeve and a valve piston adapted for relatively longitudinal reciprocating movement to provide for selective alignment of said additional orifices.

13. The strut of claim 12 wherein said outer valve sleeve provides a stop for said valve piston during movement thereof for aligning said orifices.

14. The strut of claim 13 wherein fluid pressure is provided within said outer cylinder opposing said inner cylinder, piston and valve piston causing said valve piston to remain closed.

15. The strut of claim 8 wherein the said inner cylinder is provided with an exterior pressurized accumulator vessel for receiving fluid flow from said inner cylinder.

16. The strut of claim 15 wherein said valve means comprises an external valve interposed between said exterior pressurized accumulator vessel and said inner cylinder for regulating flow of said incompressible liquid from said inner cylinder to said exterior pressurized accumulator vessel.

17. The strut of claim 16 wherein said external valve is activated by a preset fluid pressure occurring within said inner cylinder.

18. The strut of claim 17 wherein said external valve provides means for fluid to flow from the said exterior pressurized accumulator vessel to the inner cylinder.

19. The strut of claim 8 wherein said valve means comprises an internal valve for permitting flow from said inner cylinder to the outer cylinder via the longitudinal passage.

20. The strut of claim 16 wherein said external valve is activated by a preset fluid pressure occurring within said inner cylinder.

21. The strut of claim 16 wherein said valve is activated by a structural load sensor attached to said inner cylinder opposite the end within the outer cylinder.

22. The strut of claim 16 wherein said valve is activated by an accelerometer sensor attached to said inner cylinder.

23. The strut of claim 8 wherein said means for applying fluid pressure to said piston head is adapted to provide a quantitative amount of compressed gas for selective positioning of the piston within the outer cylinder.

* * * * *